United States Patent [19]

Lyell

[11] Patent Number: 5,878,698
[45] Date of Patent: Mar. 9, 1999

[54] ORNAMENTAL PET COLLAR COVER

[76] Inventor: J. Suzanne Lyell, 3501 Montgomery La., Pascagoula, Miss. 39567

[21] Appl. No.: 980,828

[22] Filed: Dec. 1, 1997

Related U.S. Application Data

[63] Continuation-in-part of Ser. No. 850,892, May 2, 1997, abandoned.

[51] Int. Cl.[6] ................................................. A01K 27/00
[52] U.S. Cl. ............................................................ 119/863
[58] Field of Search ................................... 119/858, 856, 119/863

[56] References Cited

U.S. PATENT DOCUMENTS

| D. 243,411 | 2/1977 | Johnson | D30/38 |
|---|---|---|---|
| D. 337,133 | 7/1993 | Olsen et al. | D21/62 |
| 4,266,511 | 5/1981 | Muench | 119/106 |
| 4,407,233 | 10/1983 | Bozzacco | 119/106 |
| 4,936,699 | 6/1990 | Yoshida | 401/48 |
| 5,467,743 | 11/1995 | Doose | 119/864 |

FOREIGN PATENT DOCUMENTS

| 2160405 | 12/1985 | United Kingdom | 119/858 |
|---|---|---|---|

*Primary Examiner*—Thomas Price
*Attorney, Agent, or Firm*—Wenderoth, Lind & Ponack, L.L.P.

[57] ABSTRACT

This invention is directed to an ornamental pet collar cover having an ornamental figure secured thereto, to a kit containing the ornamental pet collar cover together with a plurality of ornamental figures, to a combination of the ornamental pet collar cover together with a pet collar, and to a combination of the ornamental pet collar together with an ornamental pet leash cover. The ornamental figure has a decorated shape and appearance to celebrate a holiday or special event. For example, the ornamental figure may be a flag to celebrate the 4th of July or other national holiday. The ornamental figure may be a heart to celebrate Valentine's day. The ornamental figure may be a cross to celebrate Easter or Christmas. The ornamental figure may be a turkey to celebrate Thanksgiving.

20 Claims, 3 Drawing Sheets

ORNAMENTAL PET COLLAR COVER

This is a continuation-in-part of application Ser. No. 08/850,892 filed May 2, 1997, now abandoned.

BACKGROUND OF THE INVENTION

1. Field of the Invention

This invention is directed to an ornamental pet collar cover having an ornamental figure secured thereto, to a kit containing the ornamental pet collar cover together with a plurality of ornamental figures, to a combination of the ornamental pet collar cover together with a pet collar, and to a combination of the ornamental pet collar cover together with an ornamental pet leash cover.

2. Description of Related Art

Pet owners are spending an increasing degree of attention and money on their pets. From the standpoint of basic essentials, pet owners are more likely now than ever in the past to provide their pets with adequate health care, quality food, vitamins, and medicines. From the standpoint of luxury items, pet owners are demanding increased choices in grooming, toys, jewelry and ornamental accessories.

Among ornamental accessory items for pets, various ornamental pet collars and covers are known. See for example, U.S. Pat. Nos. 4,266,511; 4,407,233; 5,467,743; and U.S. Design Pat. No. Des. 243,411.

No ornamental pet collar cover, however, has ever been known which is an attractive way to ornament your pet for a special holiday or event. More specifically, no ornamental pet collar cover has ever before been known which comprises a cylindrical member made of a pliable material for covering the collar, having an ornamental figure secured to an outer surface of the cylindrical member at an intermediate location between the opposing ends of the cylindrical member.

SUMMARY OF THE INVENTION

It is an object of the invention to provide a novel and attractive ornamental cover for a pet collar, having an ornamental figure secured to an outer surface of the cover.

Specifically, the ornamental pet collar cover comprises an elongated rectangular section of pliable material having a first longitudinal edge, a second longitudinal edge, and opposing planar surfaces. The first and second longitudinal edges are overlapped and secured together so as to form an open-ended cylindrical member for receiving a collar.

Furthermore, the ornamental pet collar cover includes an ornamental figure secured to an outer surface of the cylindrical member at an intermediate location between opposing ends of the longitudinal members.

The ornamental figure has a decorated shape and appearance to celebrate a holiday or special event. For example, the ornamental figure may be a flag to celebrate the 4th of July or other national holiday. The ornamental figure may be a heart to celebrate Valentine's day. The ornamental figure may be a cross to celebrate Easter or Christmas. The ornamental figure may be a turkey to celebrate Thanksgiving. Other embodiments are described in more detail below and will be apparent to the ordinary person.

The elongated rectangular section of the collar cover may include attaching means for attaching the overlapping first and second longitudinal edges of the elongated rectangular section. The attaching means may comprise a hook and loop fastener disposed along the first longitudinal edge and the second longitudinal edge on an opposite side of the elongated rectangular section relative to the hook and loop fastener disposed along the first longitudinal edge.

Alternatively, the overlapping first and second longitudinal edges are secured by glue or by being sewn together or by another conventional means.

The ornamental figure may be secured to the outer surface of the cylindrical member by glue or by being sewn thereto with stitches or by other conventional means. Alternatively, the ornamental figure may be secured to the outer surface of the cylindrical member by a hook and loop fastener, such that the opposed hook and loop fastener members are disposed on an outer surface of the ornamental figure and on the outer surface of the cylindrical member at an intermediate location between the opposing ends of the longitudinal members.

In order to ensure that the ornamental figure stands in a vertical orientation when the cover is applied on a collar, a securing strap can be provided on the cover at a location directly opposite the ornamental figure.

Also provided is a kit containing the ornamental pet collar cover, together with a plurality of ornamental figures which may be selectively secured and detached by the purchaser. Preferably, the ornamental figures are detachably secured to the ornamental collar cover using a hook and loop fastener. The same ornamental collar cover may thus be used to celebrate any desired holiday or special event throughout the year by switching the ornamental figures as necessary.

A combination of the ornamental pet collar cover together with a pet collar is envisioned as another embodiment of this invention.

A combination of the ornamental pet collar cover together with an ornamental leash cover is envisioned as a further embodiment of this invention. The leash cover is constructed similar to the ornamental collar cover, using the same or a different kind of pliable material for covering the leash, except that the leash cover is not provided with any ornamental figure.

DETAILED DESCRIPTION OF THE PREFERRED EMBODIMENT(S)

Figure 1:
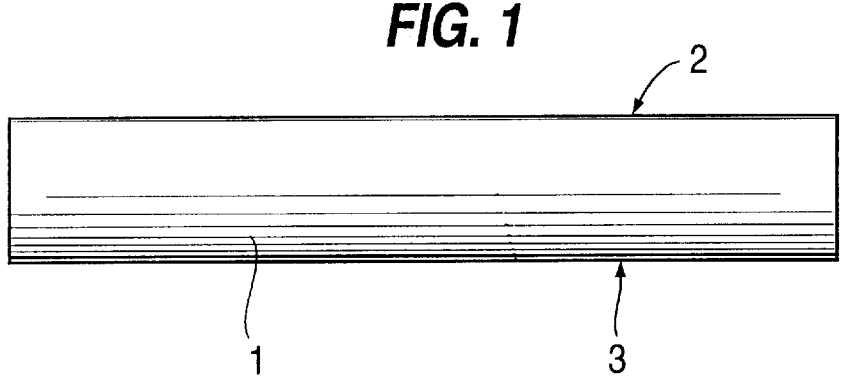
FIG. 1 is a top plan view of an elongated rectangular section of an ornamental pet collar cover according to this invention shown in an open non-overlapped condition.
Figure 2:
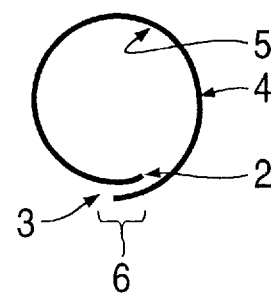
FIG. 2 is an end view of an elongated rectangular section of an ornamental pet collar cover according to this invention shown in an overlapped condition.
Figure 3:
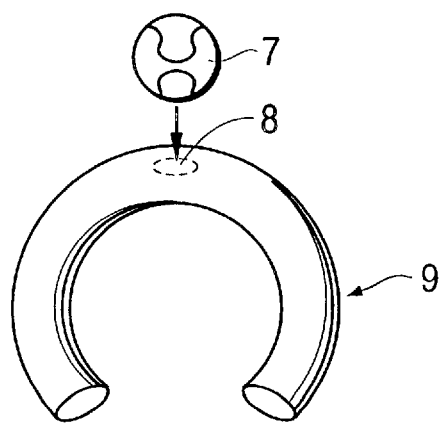
FIG. 3 is a front elevational view of a cylindrical member of an ornamental pet collar cover according to this invention showing the attachment of one embodiment of an ornamental figure to the cylindrical member.

With reference to FIG. 1 and FIG. 2, the ornamental pet collar cover of this invention comprises an elongated rectangular section (1) of pliable material having a first longitudinal edge (2), a second longitudinal edge (3), and opposing planar surfaces (4,5). The first and second longitudinal edges are overlapped and secured together so as to form an open-ended cylindrical member (9) (See FIG. 3) for receiving a collar.

The overlapping first and second longitudinal edges (6) may be secured by being sewn together, by glue, or by another conventional means.

Alternatively, the overlapping first and second longitudinal edges may include attaching means for attaching the overlapping first and second longitudinal edges of the elongated rectangular section.

Figure 5:
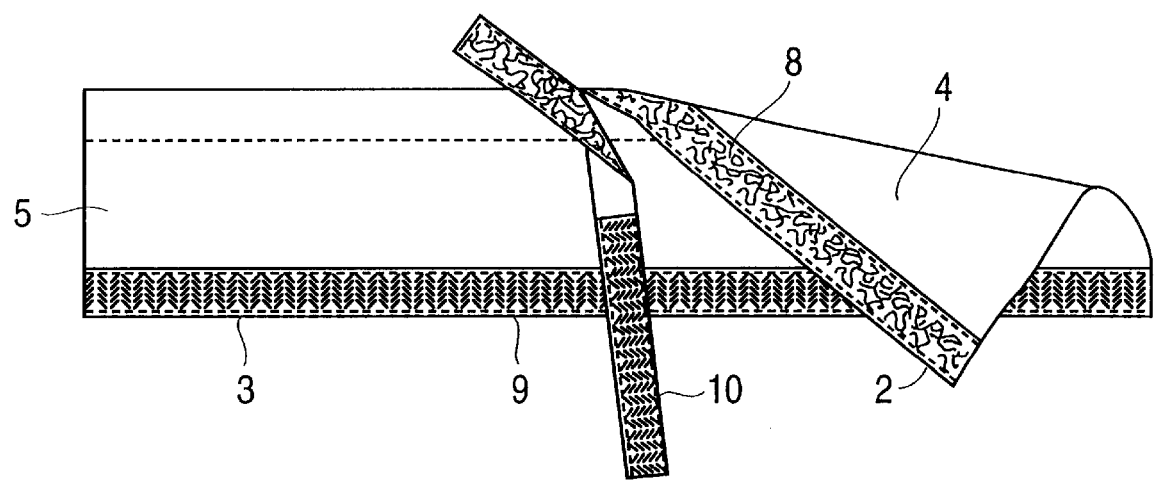
FIG. 5 is a plan view of the elongated rectangular section of the ornamental pet collar cover with a portion thereof folded over.

The attaching means may be any conventional attachment means. Preferably, as shown in FIG. 5, the attaching means comprise a conventional hook and loop fastener comprising first (8) and second (9) opposing members. The first opposing member (8) of the hook and loop fastener is disposed along the first longitudinal edge. The second opposing member (9) of the hook and loop fastener is disposed along the second longitudinal edge on an opposite side of the elongated rectangular section relative to the first opposing member of the hook and loop fastener disposed along the first longitudinal edge. As shown in FIG. 5, the hook and loop fasteners may be continuous along the entire first and second longitudinal edges. Alternatively, the hook and loop fasteners may be discontinuous along these edges.

To ensure that the ornamental figure stands erect when the cover is applied on a collar, a securing strap (10) is provided as illustrated in FIG. 5. The strap is attached to the inner surface (5) of the collar cover at a location which is directly opposed to the attachment position of the ornamental figure. The securing strap is provided with a releasible fastening device such as a hook and loop fastener as shown in the figure. However, the releasible device may also include, for example, snaps, buttons, or hooks.

When applying the cover shown in FIG. 5 to a collar, the collar is positioned on the inner surface (5) of the cover and the securing strap is tightly wrapped around the collar width and the opposing end portions are connected. The longitudinal edges are then overlapped and connected.

The pliable material forming the collar cover may be any natural or synthetic fabric or cloth material, such as nylon, rayon, felt, satin, cotton; or blends thereof such as cotton/synthetic fiber blends; or leather, etc. The material may furthermore be any color or pattern as desired by the user.

The ornamental collar cover further includes an ornamental figure (7) secured to an outer surface of the cylindrical member at an intermediate location (8) between opposing ends of the longitudinal members.

The ornamental figure is secured to the outer surface of the cylindrical member by glue or stitches or by another conventional means.

Alternatively, the ornamental figure is secured to the outer surface of the cylindrical member by a hook and loop fastener comprising first and second opposing members. The first opposing member of the hook and loop fastener is disposed on an outer surface of the ornamental figure, preferably at the base or lower portion of the figure. The second opposing member of the hook and loop fastener is disposed on the outer surface of the cylindrical member at an intermediate location between the opposing ends of the longitudinal members.

The ornamental figure has a decorated shape and appearance to celebrate a holiday or special event. The decorated shape and appearance may be, but is not limited to, shapes and appearances selected from the group consisting of a flag, heart, cross, turkey, tree, pumpkin, witch, baby, ghost, bunny, angel, fairy, theater masks, reindeer, human form, star, baseball, football, soccer ball, menorah, and star of David.

Figure 4:
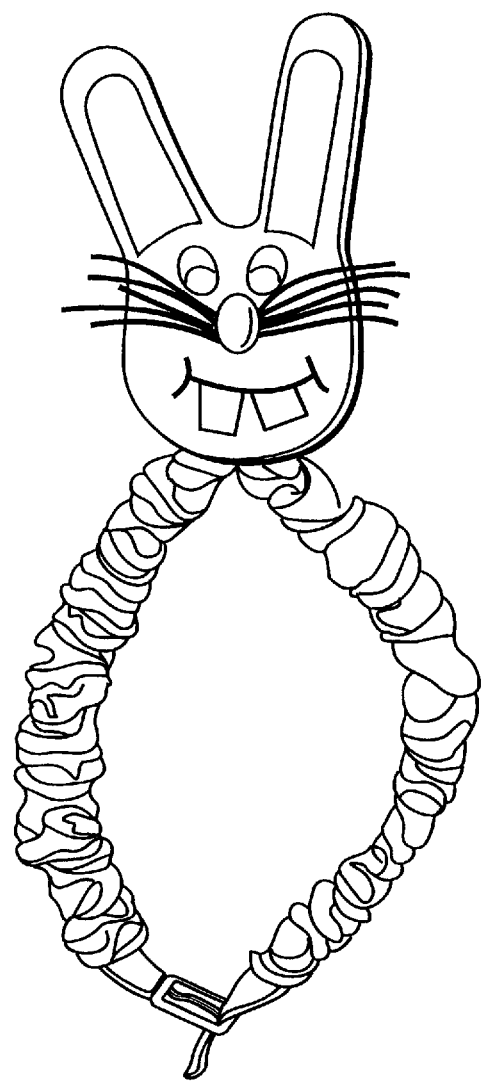
FIG. 4 is a front elevational view of an ornamental pet collar cover according to this invention shown in use covering a pet collar.

For example, the ornamental figure may be a flag to celebrate the 4th of July or other national holiday. The ornamental figure may be a heart to celebrate Valentine's day. The ornamental figure may be a cross to celebrate Easter. The ornamental figure may be a turkey to celebrate Thanksgiving. The ornamental figure may be a Christmas tree or reindeer to celebrate Christmas. The ornamental figure may be a pumpkin, ghost or witch to celebrate Halloween. The ornamental figure may be a baby to celebrate the birth of a new child. The ornamental figure may be a bunny to celebrate Easter. See FIG. 4. The ornamental figure may be a baseball, football or soccer ball to celebrate a sporting event. The ornamental figure may be a menorah or star of David to celebrate a Jewish holiday. Other embodiments will be apparent to the ordinary person.

The ornamental figure may be made of any material so long as the ornamental figure is lightweight and retains its shape and appearance in use. Preferably, the ornamental figure has some rigidity to enable the ornamental figure to stand up from the collar in a generally vertical orientation so that it is visible to a viewer. See FIG. 4. In other words, a soft flexible one-ply cloth by itself would not be suitable because it would not have sufficient rigidity to project from the collar so as to be visible to a viewer.

Preferably, an ornamental figure according to this invention is comprised of a soft flexible natural or synthetic fabric or cloth material provided that it is constructed to retain its shape and appearance. Suitable fabric or cloth materials include but are not limited to nylon, rayon, felt, satin, cotton; or blends thereof such as cotton/synthetic fiber blends. To retain the shape and appearance of such figures, the figures may be stuffed with a suitable soft material, such materials for stuffing pillow, felt, cotton, etc. Alternatively, the figure may be comprised of many plies of the fabric or cloth material.

As another alternative, the figure may be comprised of leather or a lightweight plastic, etc. The leather or plastic figure may be stuffed or hollow, so long as it retains its shape and appearance. Ornamental figures may be easily constructed from any of such materials to retain their shape and appearance and to possess at least some degree of partial or semi-rigidity.

The material may furthermore be any color or pattern as desired by the user. The figure may furthermore be decorated to have the desired appearance using any suitable decorative materials, such as dyes, paints, feathers, glue, sequins, felt pieces, etc.

The size of the ornamental figure is not limited, but preferably the size of the ornamental figure is 1–2" in height, 1–2" in width and ½–1" in thickness.

A ring (10) for attachment of a leash to the collar cover may be attached to the outer surface of the collar cover near or at the ornament. See FIG. 3. The ring may be made of any conventional material, preferably metal, and made in any conventional shape. The ring may be attached, e.g., by stitching. Attachment of a lease to the ring provided on the collar cover instead of the ring provided on the collar itself prevents or inhibits the ornament from rotating towards the ground when the animal pulls on the leash.

The kit covered by this invention contains an ornamental pet collar cover as described above. More specifically, the collar cover comprises an elongated rectangular section of pliable material having a first longitudinal edge, a second longitudinal edge, and opposing planar surface. The first and second longitudinal edges are overlapped and secured together so as to form an open-ended cylindrical member for receiving a collar. The cylindrical member has a first opposing member of a hook and loop fastener disposed on an outer surface of the cylindrical member at an intermediate location between opposing ends of said longitudinal members.

The kit further includes a plurality of ornamental figures, each having a second opposing member of said hook and loop fastener disposed on an outer surface of the ornamental figure, for securing one of the ornamental figures at a time to the first opposing member of the hook and loop fastener disposed on the outer surface of the cylindrical member. The ornamental figures provided in the kit are the same construction as described above, provided that they have different appearances and shapes. The same ornamental collar cover may thus be used to celebrate any desired holiday or special event throughout the year by switching the ornamental figures as necessary. The kit may contain any desired number of ornamental figures, such as two, four, six, eight, ten, etc.

The invention further contemplates a combination of a pet collar and an ornamental pet collar cover as described above. The pet collar of the combination comprises an elongate collar member having first and second opposing ends, and an interlocking connector provided between said first and second ends for securing the first and second ends together. Any conventional collar made of fabric, leather, etc. is contemplated, secured by a buckle, etc. The ornamental collar cover is the same as described above.

A combination of an ornamental pet leash cover and pet collar cover are also covered by the invention. The leash cover comprises substantially the same construction as the collar cover, without the ornamental figure. That is, the leash cover comprises a first elongated rectangular section of pliable material having a first longitudinal edge, a second longitudinal edge, and opposing planar surfaces. The first and second longitudinal edges of the first elongated rectangular section are overlapped and secured together so as to form an open-ended cylindrical member for receiving a pet leash.

The collar cover is constructed as described above. In this combination, the collar cover comprises a second elongated rectangular section of pliable material having a first longitudinal edge, a second longitudinal edge, and opposing planar surfaces, wherein the first and second longitudinal edges of the second rectangular section are overlapped and secured together so as to form an open-ended cylindrical member for receiving a collar. The collar cover includes an ornamental figure secured to an outer surface of the cylindrical member at an intermediate location between opposing ends of the longitudinal members.

The pliable materials used to construct the leash cover are may be any suitable material such as described for constructing the collar cover. In addition, the material selected for the leash cover may be the same, or different, as that selected for the collar cover.

While this invention has been described with reference to particular embodiments, those skilled in the art will be able to make various modifications to the described embodiments of the invention without departing from the scope and spirit of this invention. It is intended that all modifications of the invention described hereinabove which result in an embodiment that is the same or equivalent to the claimed invention be within the scope of this invention.

What is claimed is:

1. An ornamental pet collar cover comprising:
   an elongated rectangular section of pliable material having a first longitudinal edge, a second longitudinal edge, and opposing planar surfaces,
   wherein said first and second longitudinal edges are overlapped and secured together so as to form an open-ended cylindrical member for receiving a collar; and
   an ornamental figure secured to an outer surface of said cylindrical member at an intermediate location between opposing ends of said first and second longitudinal edges.

2. The ornamental pet collar cover as claimed in claim 1, further comprising attaching means for attaching said overlapping first and second longitudinal edges of said elongated rectangular section.

3. The ornamental pet collar cover as claimed in claim 2, wherein said attaching means comprises a hook and loop fastener comprising first and second opposing members, said first opposing member of said hook and loop fastener disposed along said first longitudinal edge and said second opposing member of said hook and loop fastener disposed along said second longitudinal edge on an opposite side of said elongated rectangular section relative to said first opposing member of said hook and loop fastener disposed along said first longitudinal edge.

4. The ornamental pet collar cover as claimed in claim 1, wherein said overlapping first and second longitudinal edges are sewn together.

5. The ornamental pet collar cover as claimed in claim 1, wherein said ornamental figure is secured to the outer surface of said cylindrical member by glue or stitches.

6. The ornamental pet collar cover as claimed in claim 1, wherein said ornamental figure is secured to the outer surface of said cylindrical member by a hook and loop fastener comprising first and second opposing members, said first opposing member of said hook and loop fastener disposed on an outer surface of said soft ornamental figure and said second opposing member of said hook and loop fastener disposed on the outer surface of said cylindrical member at an intermediate location between the opposing ends of said longitudinal members.

7. The ornamental pet collar cover as claimed in claim 1, wherein said ornamental figure has a decorated shape and appearance selected from the group consisting of a flag, heart, cross, turkey, tree, pumpkin, witch, baby, ghost, bunny, angel, fairy, theater masks, reindeer, human form, star, baseball, football, soccer ball, menorah, and star of David.

8. An ornamental pet collar cover comprising:
   an elongated rectangular section of pliable material having a first longitudinal edge portion, a second longitudinal edge portion, and opposing planar surfaces defining an outer cover surface and an inner cover surface,
   wherein said first and second longitudinal edge portions are overlapped and secured together so as to form an open-ended cylindrical member for a collar; and
   an ornamental figure secured to said outer cover surface at an intermediate location between opposing ends of said longitudinal edge portions.

9. The ornamental pet collar cover as claimed in claim 8, further comprising a collar securing strap attached to said inner cover surface at a location directly opposed to said ornamental figure.

10. A kit comprising:
    an ornamental pet collar cover comprising an elongated rectangular section of pliable material having a first longitudinal edge, a second longitudinal edge, and opposing planar surfaces,
    wherein said first and second longitudinal edges are overlapped and secured together so as to form an open-ended cylindrical member for receiving a collar, and
    wherein said cylindrical member having a first opposing member of a hook and loop fastener disposed on an outer surface of said cylindrical member at an intermediate location between opposing ends of said longitudinal members; and a plurality of ornamental figures, each having a second opposing member of said hook and loop fastener disposed on an outer surface of said ornamental figure, for securing one of said ornamental figures to said first opposing member of said hook and loop fastener disposed on the outer surface of said cylindrical member.

11. The kit as claimed in claim 10, wherein said elongated rectangular section further comprises attaching means for attaching said overlapping first and second longitudinal edges.

12. The kit as claimed in claim 11, wherein said attaching means comprises a hook and loop fastener comprising first and second opposing members, said first opposing member of said hook and loop fastener disposed along said first longitudinal edge and said second opposing member of said hook and loop fastener disposed along said second longitudinal edge on an opposite side of said elongated rectangular section relative to said first opposing member of said hook and loop fastener disposed along said first longitudinal edge.

13. A pet collar and an ornamental pet collar cover combination comprising:

an elongate collar member having first and second opposing ends;

an interlocking connector provided between said first and second ends for securing said first and second ends together;

an elongated rectangular section of pliable material having a first longitudinal edge, a second longitudinal edge, and opposing planar surfaces, wherein said first and second longitudinal edges are overlapped and secured together so as to form an open-ended cylindrical member, wherein said elongate collar member is inserted in said open-ended cylindrical member; and an ornamental figure secured to an outer surface of said cylindrical member at an intermediate location between opposing ends of said longitudinal members.

14. The pet collar and ornamental pet collar cover combination as claimed in claim 13, wherein said elongated rectangular section further comprises attaching means for attaching said overlapping first and second longitudinal edges.

15. The pet collar and ornamental pet collar cover combination as claimed in claim 14, wherein said attaching means comprises a hook and loop fastener comprising first and second opposing members, said first opposing member of said hook and loop fastener disposed along said first longitudinal edge and said second opposing member of said hook and loop fastener disposed along said second longitudinal edge on an opposite side of said elongated rectangular section relative to said first opposing member of said hook and loop fastener disposed along said first longitudinal edge.

16. The pet collar and ornamental pet collar cover combination as claimed in claim 13, wherein said overlapping first and second longitudinal edges are sewn together.

17. The pet collar and ornamental pet collar cover combination as claimed in claim 13, wherein said ornamental figure is secured to the outer surface of said cylindrical member by glue or stitches.

18. The pet collar and ornamental pet collar cover combination as claimed in claim 13, wherein said ornamental figure is secured to the outer surface of said cylindrical member by a hook and loop fastener comprising first and second opposing members, said first opposing member of said hook and loop fastener disposed on an outer surface of said soft ornamental figure and said second opposing member of said hook and loop fastener disposed on the outer surface of said cylindrical member at an intermediate location between the opposing ends of said longitudinal members.

19. The pet collar and ornamental pet collar cover combination as claimed in claim 13, wherein said ornamental figure has a decorated shape and appearance selected from the group consisting of a flag, heart, cross, turkey, tree, pumpkin, witch, baby, ghost, bunny, angel, fairy, theater masks, reindeer, human form, star, baseball, football, soccer ball, menorah, and star of David.

20. An ornamental pet leash cover and pet collar cover combination, comprising:

a first elongated rectangular section of pliable material having a first longitudinal edge, a second longitudinal edge, and opposing planar surfaces, wherein said first and second longitudinal edges of said first elongated rectangular section are overlapped and secured together so as to form an open-ended cylindrical member for receiving a pet leash; and a second elongated rectangular section of pliable material having a first longitudinal edge, a second longitudinal edge, and opposing planar surfaces, wherein said first and second longitudinal edges of said second rectangular section are overlapped and secured together so as to form an open-ended cylindrical member for receiving a collar; and an ornamental figure secured to an outer surface of said cylindrical member at an intermediate location between opposing ends of said longitudinal members.

* * * * *